United States Patent [19]

Grosjean et al.

[11] Patent Number: 5,597,431
[45] Date of Patent: Jan. 28, 1997

[54] DEVICE AND METHOD FOR THE SERIES PRODUCTION OF FIBER REINFORCED RESIN PARTS

[75] Inventors: François Grosjean, Versailles; Michel Huvey, Bougival; Bernard Dewimille, Corbeil Essonne, all of France

[73] Assignee: Institut Francais du Petrole, Rueil-Malmaison, France

[21] Appl. No.: 517,657

[22] Filed: Aug. 22, 1995

Related U.S. Application Data

[63] Continuation of Ser. No. 319,684, Oct. 7, 1994, abandoned.

[30] Foreign Application Priority Data

Oct. 8, 1993 [FR] France ................................. 93 12104

[51] Int. Cl.⁶ .......................... B65H 81/00; F16F 1/18
[52] U.S. Cl. ........................ 156/169; 156/173; 156/174; 156/175; 156/425; 156/433; 156/441; 264/281; 267/148; 267/149
[58] Field of Search ................................. 156/169, 173, 156/175, 174, 441, 433, 425, 245; 264/281; 267/148, 149, 166

[56] References Cited

U.S. PATENT DOCUMENTS

| 3,378,426 | 4/1968 | Medney | 156/441 X |
| 3,728,189 | 4/1973 | Hannes et al. | 264/281 X |
| 3,873,399 | 3/1975 | Goldsworthy et al. | 264/281 X |
| 4,260,143 | 4/1981 | Kliger | 267/166 X |
| 4,434,121 | 2/1984 | Schaper | 264/281 X |
| 4,440,593 | 4/1984 | Goldsworthy | 156/441 |
| 4,445,957 | 5/1984 | Harvey | 156/441 X |
| 5,158,631 | 10/1992 | Leoni et al. | 156/175 X |

FOREIGN PATENT DOCUMENTS

| 2401760 | 4/1979 | France | 267/148 |
| 3243519 | 5/1984 | Germany | 156/174 |
| 54-52174 | 4/1979 | Japan | 264/281 |
| 59-144837 | 8/1984 | Japan | 264/149 |
| WO88/07927 | 10/1988 | WIPO . | |

OTHER PUBLICATIONS

Database WPI, Week 8117, Derwent Publications Ltd., London, GB; AN 81–300250 (abstract of JP–A–56 024 123)(Showa Elec Wire) 7 Mars 1981.
Patent Abstracts of Japan, vol. 10, No. 238 (M–508)(2294) 16 Août 1986 (abstract of JP–A–61 069 439)(Nikkiso) 4 Octobre 1986.

*Primary Examiner*—Jeff H. Aftergut
*Attorney, Agent, or Firm*—Millen, White, Zelano, & Branigan, P.C.

[57] ABSTRACT

The present invention relates to a method and to a device for manufacturing parts made from resin and reinforcing fibers by winding. Molding means including a plurality of female forms corresponding each to a print of the part to be manufactured are produced. The forms are arranged one after the other, substantially helically, so as to make a continuous groove, then said groove is filled by winding with fibers coated with a polymerizable resin by rotating the prints round the axis of the helix.

14 Claims, 1 Drawing Sheet

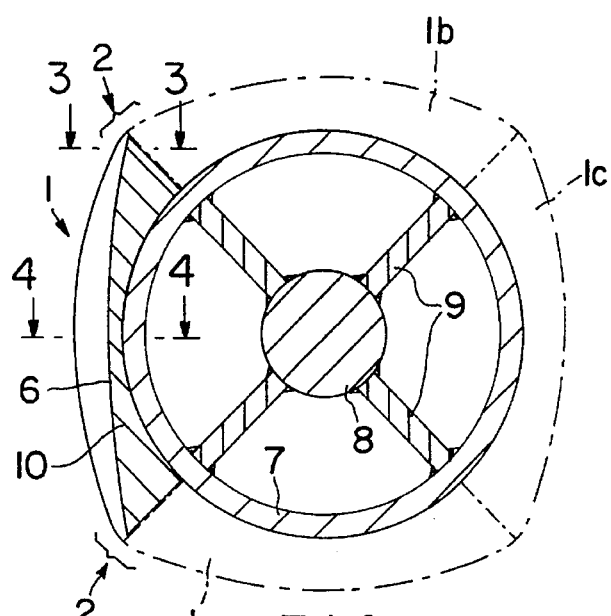
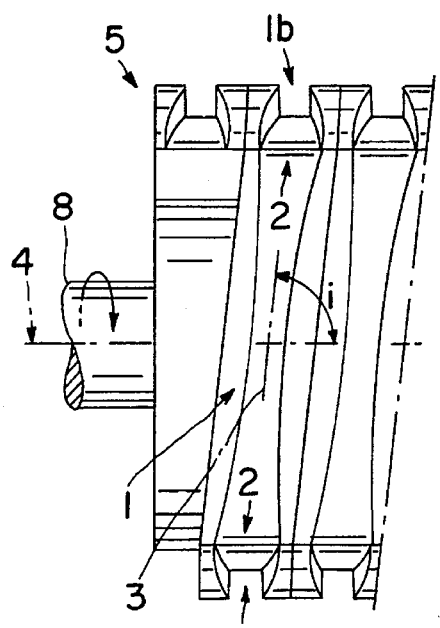
FIG. 2
FIG. 1
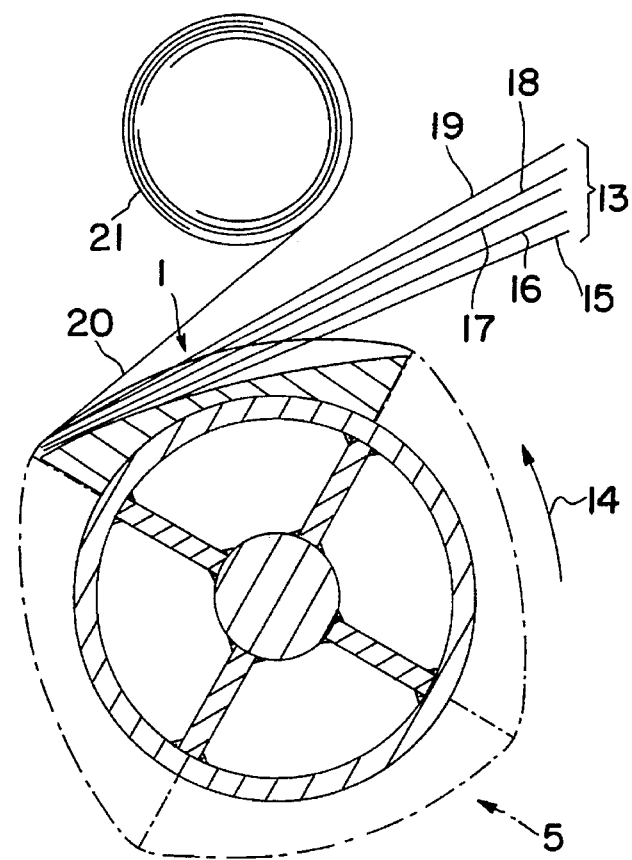
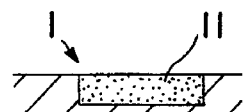
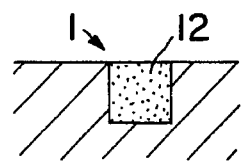
FIG. 3
FIG. 4
FIG. 5

DEVICE AND METHOD FOR THE SERIES PRODUCTION OF FIBER REINFORCED RESIN PARTS

This application is a continuation of application Ser. No. 08/319,684, filed Oct. 7, 1994, now abandoned.

BACKGROUND OF THE INVENTION

The present invention relates to a method and to a device for manufacturing parts made from a fiber-reinforced polymerizable resin. The device includes molding means suited to the production of a series of parts.

U.S. Pat. No. 4,445,957, U.S. Pat. No. 3,873,399 and U.S. Pat. No. 4,440,593 describe a method and an apparatus for manufacturing parts made from a fiber-reinforced resin, but they relate to the pultrusion technique in which the associated molding means do not allow high production rates.

SUMMARY OF THE INVENTION

The present invention thus relates to a method for manufacturing parts made from resin and reinforcing fibers. Said part has an elongated main size and sections perpendicular to said main size having a substantially constant surface. The method comprises the following stages:

molding means including a plurality of female forms corresponding to a print of a part are manufactured, said forms are arranged one after the other substantially helically, so that said prints make a substantially continuous groove, said groove is filled by winding with fibers coated with a polymerizable resin, by rotating said molding means round the axis of the helix.

According to the method, after winding, the molding means may be placed in means for polymerizing the resin.

Means for closing said groove may be placed on the molding means.

A closing band may be wound on said groove round the molding means, said winding being perforated prior to or after the filling of the groove.

Said groove may be filled with successive layers of coated reinforcing fiber sheets.

The present invention further relates to a device for manufacturing parts made from resin and reinforcing fibers. Said parts have an elongated main size and sections perpendicular to said main size having a substantially constant surface. The device includes molding means having a plurality of female forms corresponding to a print of a part. The forms are arranged one after the other, substantially helically, so that said prints form a substantially continuous groove.

The device may include means for closing the groove.

The closing means may include a band wound helically on the molds.

The molding means may include a plurality, of molds, each of the molds including at least one print.

The device may comprise means for driving the molding means into rotation and guide means for guiding the coated fiber sheets.

According to an embodiment of the invention, it is possible to uncouple the molding stage and the polymerization stage. The mold filling rate is thus no longer limited by the duration of the polymerization operation.

BRIEF DESCRIPTION OF THE DRAWINGS

Other features and advantages of the present invention will be clear from reading the description hereafter of non limitative examples, with reference to the accompanying drawings in which:

FIG. 1 is a side view of the winding molding means.

FIG. 2 shows a section of the form of a print of a mold from the molding means,

FIGS. 3 and 4 both show the cross-section of the groove in two different places, FIG. 5 diagrammatically shows the operation of filling of the groove by winding the reinforcing wires and the setting of means for closing the groove.

DESCRIPTION OF THE PREFERRED EMBODIMENTS

In FIG. 1, the female form 1 which corresponds to the print of a part made from a composite material is interposed between a form 1a and a form 1b. The forms may be all identical or have different sizes. The cross-sections of these forms 1, 1a and 1b have substantially equal surfaces so that, by winding the resin-coated reinforcing wires, the prints may be filled substantially completely from a predetermined volume of fibers distributed continuously by guide heads of a winding device.

In another embodiment of the invention, it is envisaged to have prints whose cross-sections have no equal surfaces. In fact, the filling of the print may not be complete on the whole or on part of the mold without departing from the scope of the present invention.

The groove portions consisting of the female forms 1, 1a and 1b are connected to each other by channels or groove portions 2.

The main direction of print 1, substantially shown by direction 3, forms an angle i with the axis 4 merged with the axis of rotation of mandrel 5, which consists of the plurality of prints. This angle i is substantially equal to the angle of a helix of axis 4. The forms 1, 1a and 1b are arranged on a mandrel 5 substantially helically, so that the various groove portions (2, 1a, 2, 1, 2, 1b . . . ) make up a substantially continuous groove. The groove is said to be substantially continuous because, in a variant of the invention, there may be a transverse free space at the level of the intermediate channels 2, for example to allow passage of a blade of a cutting tool.

According to the invention, a mandrel 5 is manufactured on which a plurality of forms of type 1 are arranged one after the other in the same way as forms 1, 1a and 1b described above. The winding molding mandrel thus includes at least one continuous groove equivalent to the general shape of a thread of a screw pitch, but with a variable cross-section. Such a mandrel 5 allows to form by winding as many parts as the mandrel has type 1 prints in a single operation.

The parts molded in prints 1 preferably display a certain convexity with respect to the outside of the mandrel. The convex form of the parts may result from their geometrical shape including a circular curvature or not, or from a succession of rectilinear parts, or from a combination of both shapes.

FIG. 2 shows an embodiment of a mandrel including prints 1 whose bottom 6 is substantially cylindrical and whose convexity is, in this case, greater than that of the mandrel. The advantage of a convex shape is linked to the winding technique and is explained below.

In FIG. 2, a type 1 print is contained in a 45° arc sector. Thus, a complete circumference of the groove consists of four print forms of type 1: 1, 1a, 1b and 1c. Of course, this arrangement is not limitative, the number of prints per circumference notably depends on the dimensions of the parts to be manufactured and on the external dimension of the molding mandrel. In fact, if the parts are short and if they have a slight curvature, for the same manufacturing rate, one may use either a mandrel of large diameter and of small length, or a mandrel with a smaller diameter and a greater length.

Furthermore, it should be noted that the substantially continuous shape of the groove should include no concave part with respect to the distributor heads delivering the coated wires, because the bottom of the concave parts could not be completely filled with the wire sheets during the winding operation. However, the opposite case may exist insofar as these concave parts do not correspond to sections of the parts to be manufactured, but to intermediate portions located between consecutive parts, for example channels 2.

FIG. 2 shows in detail an embodiment of the molding means in which a cylinder 7 bears mold elements 10 on its outer surface. Each mold element 10 includes at least one female form of type 1 and intermediate channels 2 in the continuation of the female form. This modular design allows to manufacture only one mold element model to form a molding mandrel including as many prints as type 10 molds are arranged. The mold elements may be fastened to cylinder 7 by any means known in the art.

Of course, when several types of parts are molded on the same mandrel, the mold elements having different prints will be suited for being assembled to one another.

A shaft 8 is fastened to cylinder 7 by means of braces 9. Shaft 8 is suited for driving mandrel 5 into rotation to perform the winding operation.

Without departing from the scope of the invention, it is possible to use supporting means different from those described above for holding the mold elements 10, such as cylinder 7, braces 9 and shaft 8. In fact, fitting a fastening and a holding means for a series of mold elements 10 arranged according to the invention is understandable to the man skilled in the art who knows about mechanics.

FIG. 3 is a cutaway view of a section perpendicular to the main direction of the groove, substantially near the end of the part print. Section 11 here is rectangular, with a great width with respect to the thickness.

FIG. 4 is a cutaway view of a section 12 substantially in the middle of the manufactured part. The cross-sectional area of section 12, substantially square, is equal to the cross-sectional area of section 11 shown in FIG. 3 which is different in shape because it is rectangular with unequal sides.

The parts or articles made according to this structure might fulfil the purpose of bending spring leaves, the central part displaying a greater rigidity than the ends by being thicker. Of course, the present invention is not limited to parts having the geometrical shape of these examples as their section, and in an equivalent way, the sections may be semicircular, parallelepipedic, triangular, etc. It is of substantial significance that the articles or parts are made from severing a main blank which has the form of a helix on the ends of sections each of which has a shape determined by the female form in which it was molded.

Print 1 is filled with resin-coated fibers, and the number of sheets of filling wires is so determined that the volume of these sheets is suited for filling at least completely prints 1. The prints are preferably filled slightly excessively, and the excess material may be wrung during or after the winding process, either by one or several rollers resting against mandrel 5, or by print closing means. Furthermore, this wringing operation may afford the advantage, apart from slightly compressing the material in the print, of providing a smoother upper surface (convex side) of better appearance.

FIG. 5 diagrammatically shows the operation of filling of the groove consisting of the plurally of prints 1 according to the filament winding technique. The filament winding technique itself is for example described in documents U.S. Pat. No. 4,904,176, U.S. Pat. No. 3,966,388 or U.S. Pat. No. 5,151.281. According to the present invention, the specific mandrel 5 is rotated in the direction of arrow 14, providing a controlled traction on a set 13 of reinforcing wires or sheets.

The convex shape of the groove of mandrel 5 promotes the tension steadiness of the reinforcing wires in said groove. In fact, the capstan effect created on the mandrel is impeded if the shape of the groove has concave parts.

The nature of the reinforcing wires and that of the impregnation resin may be those known in the art, notably the materials described in the above-cited documents.

The impregnation method may be performed by soaking, coating or preferably by the method described in document U.S. Pat. No. 4,932,352.

Preimpregnated wires according to document U.S. Pat. No. 5,133,995 for example may be used.

It is often advisable to fill prints 1 with the reinforcing wires by successive wire layers or sheets, 15, 16, 17, 18, 19 . . . The number of sheets is determined according to the surface of the section of prints 1. Filling by successive layers promotes control of the tension steadiness of the wires in the groove. This is a preponderant feature for obtaining, after polymerization, an optimum mechanical quality of the products manufactured with this technique. Thus, despite the convex shape of the prints arranged on the mandrel, the wires all have substantially the same tension value, which gives the pan an optimum resistance, considering the amount of reinforcing fibers.

Furthermore, air inclusions are limited because the risk of their being trapped is reduced. In fact, air bubbles tend to run out more easily of a thin sheet placed in the groove.

However, in some cases, it may be advantageous to gather the set 13 of sheets or wires before the point of setting in the groove. To that effect, set 13 may be passed through a guide, for example of the funnel type, or a set of rollers. The groove of the molding mandrel may also be filled from a set of fibers and resin coming from a pultrusion equipment.

In FIG. 5, reference number 20 relates to a band wound on mandrel 5 and closely leaning against the groove consisting of the plurality of prints 1. This band 20 is fastened onto the mandrel at the end of the groove and unwound from a storage drum 21 through the rotation of the mandrel, in the same way as sheets 13. This band may be made from any material providing the band with a sufficient compliance, so that it may follow the external form of the mandrel under a reasonable tension. The face of the band in contact with the resin may be preferably covered with a product intended to prevent it from slicking to the resin.

Band 20 plays the part of a groove closing means. Other closing means may be used, such as covers fastened to each print for example, without departing from the scope of the invention.

When the prints are completely filled, the mandrel is removed from the winding machine and placed in resin polymerization means in order to obtain the stabilization of the resin of the coated fibers. The stabilization time is thus advantageously independent of the winding operation, and may therefore be set mainly according to the resin type, without the winding rate on the winding machine being taken into account. The choice of the resin type may turn towards a much less reactive resin, i.e. slower to stabilize, but with a better mechanical quality.

Similarly, the groove filling operation by winding is no longer directly dependent of the stabilization time. The winding rate of the coated fibers may for example exceed 10 meters/minute and even 30 meters/minute if preimpregnated fibers are used.

If there is another mandrel, the winding operation thereof may be started during the polymerization time of the first mandrel.

When the polymerization has reached a sufficient stabilization state, the groove closing means, if there are any, are removed and the whole of the parts is taken out of the groove. All the parts then have the form of a substantially helical profile. The parts are then separated from each other by sawing. In case the sections of the groove provide too high a rigidity of said profile, thus preventing it from being extracted as a whole from the groove, each part may be removed by sawing the profile in the groove. In this case, appropriate slots must be provided in the mold at each end 2 of a print 1.

The manufacturing operation sequence according to the present invention allows manufacturing rates to be optimized through the flexibility of the method. Moreover, investments in complex machines are unnecessary.

The invention is not limited to a mandrel including a single groove consisting of a plurality of prints 1. It is conceivable that, for layout reasons, the mandrel includes several continuous grooves.

We claim:

1. A method for manufacturing articles made from resin and reinforcing fibers, wherein said articles are cut from an elongated main blank at sections thereof having a substantially constant arcuate surfaces, the method comprising the following steps:

providing molding means (5) including a plurality of female forms (1, 1a, 1b, 1c) corresponding to the shapes of the parts being manufactured, arranging said forms sequentially to form a substantially continuous groove formed as a single helix about the axis (4) of the molding means, wherein the groove is defined by non-parallel, radially extending, spaced apart stationary walls to provide sections of the main blank which when severed from the main blank by cuts in a direction transverse thereto form a plurality articles with non-parallel side surfaces;

filling said groove by winding fibers coated with a polymerizable resin on the molding means by rotating said molding means in one direction around the axis (4) of the helix while advancing the fibers in only one axial direction with respect to the groove to form helically the elongated main blank in the groove into a molded helical blank; and severing the molded helical blank at selected locations to form the plurality of individual articles having shapes complementing the female forms.

2. A method as claimed in claim 1, wherein, after filling the groove by winding, the molding means are placed in resin polymerization means.

3. A method as claimed in claim 1, wherein means for closing said groove are arranged on the molding means.

4. A method as claimed in claim 3, wherein the means for closing is a closing band (20) wound on said groove around the molding means.

5. A method as claimed in claim 1, wherein said groove is filled with successive layers of coated resin fiber sheets (13).

6. The method of claim 1, wherein the groove has substantially the same cross-sectional area throughout while varying in cross-sectional shape.

7. The method of claim 1, wherein the articles are leaf springs.

8. A device for manufacturing a plurality of articles made from resin and reinforcing fibers, wherein said articles are cut from a single elongated main blank at sections thereof having a substantially constant arcuate surface, the device comprising molding means including a plurality of female forms corresponding in shape to the shapes of the articles, said forms being arranged sequentially substantially helically, so that said shapes when joined end to end make a single substantially continuous helical groove, wherein the groove is defined by non-parallel, radially extending, spaced apart stationary walls to provide the sections of the main blank which are severed from the main blank by cuts in a direction transverse thereto to form articles with non-parallel side surfaces end wherein the device further includes a cutter for severing the main blank.

9. A device as claimed in claim 8, including groove closing means for covering the groove.

10. A device as claimed in claim 9, wherein said closing means include a band wound helically on the molds.

11. A device as claimed in claim 8, wherein said molding means include a plurality of molds, each of the molds including having at least one selected shape.

12. A device as claimed in claim 8, including means for rotating the molding means and means for guiding the coated fiber sheets into the helical groove.

13. The device of claim 8, wherein the articles are leaf springs.

14. The device of claim 8, wherein the groove has substantially the same cross-sectional area throughout while varying in cross-sectional shape.

* * * * *